(12) United States Patent
Defant et al.

(10) Patent No.: US 7,701,171 B2
(45) Date of Patent: Apr. 20, 2010

(54) SYSTEM, METHOD AND APPARATUS FOR CHARGING A WORN DEVICE

(75) Inventors: J. Chris Defant, Palm Harbor, FL (US); David Segal, Palm Harbor, FL (US); Steve Chapin, Palm Harbor, FL (US)

(73) Assignee: Pro Tech Monitoring, Inc., Odessa, FL (US)

( * ) Notice: Subject to any disclaimer, the term of this patent is extended or adjusted under 35 U.S.C. 154(b) by 297 days.

(21) Appl. No.: 11/216,868

(22) Filed: Aug. 31, 2005

(65) Prior Publication Data

US 2007/0046258 A1    Mar. 1, 2007

(51) Int. Cl.
*H02J 7/00* (2006.01)

(52) U.S. Cl. .................... 320/114; 320/113; 320/115

(58) Field of Classification Search .................. 320/107, 320/110, 112, 113, 114, 115
See application file for complete search history.

(56) References Cited

U.S. PATENT DOCUMENTS

| | | | |
|---|---|---|---|
| 5,731,757 A * | 3/1998 | Layson, Jr. ............... 340/573.1 |
| 5,768,371 A * | 6/1998 | Snyder ........................ 379/446 |
| 5,867,798 A * | 2/1999 | Inukai et al. ................. 455/573 |
| 6,653,814 B1 * | 11/2003 | Patino ......................... 320/103 |
| 6,909,915 B2 | 6/2005 | Greatbatch et al. |
| 7,085,123 B2 * | 8/2006 | Shiue et al. ............... 361/301.2 |
| 2003/0155887 A1 | 8/2003 | Bourilkov et al. |
| 2004/0095094 A1 * | 5/2004 | Kubale et al. ................ 320/114 |
| 2005/0024011 A1 * | 2/2005 | Chen ........................... 320/107 |
| 2005/0189913 A1 * | 9/2005 | Vitanov et al. ............... 320/114 |
| 2006/0103537 A1 * | 5/2006 | Defant et al. ............. 340/573.4 |
| 2006/0125444 A1 * | 6/2006 | Lam et al. .................... 320/107 |

\* cited by examiner

*Primary Examiner*—Bao Q Vu
*Assistant Examiner*—Nguyen Tran
(74) *Attorney, Agent, or Firm*—Larson & Larson, P.A.; Frank Liebenow (57) ABSTRACT

A wearable device has an internal rechargeable power source for supplying power to internal circuitry of the device. An external rechargeable battery pack is physically and electrically interfaced to the wearable device and provides power to recharge the internal rechargeable power source while the device is being worn, thereby eliminating the need to connect the wearable device directly to a source of electricity using wires. The rechargeable battery pack is recharged in a charging station connected to a source of electricity.

47 Claims, 7 Drawing Sheets

SYSTEM, METHOD AND APPARATUS FOR CHARGING A WORN DEVICE

BACKGROUND OF THE INVENTION

1. Field of the Invention

This invention relates to the field of recharging battery operated devices and more particularly to recharging battery operated devices that are worn for extended periods of time.

2. Description of the Related Art

Battery powered devices intended to be worn by people, animals or inanimate objects for extended periods of time often need to be recharged. An example of this type of device is a personal locator system such as those used to track individuals who are under house arrest. Because devices such as these must be active 24 hours per day and are not allowed to be removed, the task of recharging their internal batteries is very difficult. Currently, the wearer must remain tethered to a cable that provides power for recharging the internal batteries, causing the wearer to remain in the locale of the charger for the length of time required to recharge the internal batteries, sometimes several hours. During this time, the cable can get loose and fail to recharge the batteries or a person can get the cable caught on their legs, causing breakage of the cable or tripping of the person. It is also very easy for the wearer to forget they are connected to the charging cable and attempt to walk away, also causing breakage of the cable or tripping of the wearer.

U.S. Pat. No. 6,909,915 to Greatbatch, et al. is hereby incorporated by reference and has an implantable medical device with a dual battery system for generating higher currents needed during a defibrillation operation of the device.

US Pat. Publication No. US 2003/0155887 to Bourilkov, et al. is hereby incorporated by reference and shows one way to charge a battery from a primary (not rechargeable) battery.

What is needed is a system, device and method that will provide a device that can be worn 24 hours a day and provide un-tethered recharging of the device's internal batteries.

SUMMARY OF THE INVENTION

In one embodiment, a system for powering a worn device is disclosed including a rechargeable power source housed within the worn device and a charging interface on an outside surface of the worn device for holding a rechargeable battery pack and conducting electricity from the rechargeable battery pack into the worn device. There is a charge control circuit in the worn device for accepting the electricity from the charging interface and charging the rechargeable power source and a powered circuit housed within the worn device powered by the rechargeable power source.

In another embodiment, a method of charging a worn device is disclosed including providing the worn device with an internal rechargeable power source and a charging interface on an outside surface. The charging interface accepts and holds a rechargeable battery pack and conducts electricity from the rechargeable battery pack into the worn device. A charge control circuit within the worn device accepts the electricity from the charging interface and charges the rechargeable power source. There is an active circuit within the worn device and powered by the rechargeable power source. Also provided is the rechargeable battery pack and a charging station. The charging station is connected to a source of electricity and accepts and charges the rechargeable battery pack. The method includes charging the rechargeable battery pack in the charging station, transferring the rechargeable battery pack from the charging station to the charging interface on the worn device and charging the rechargeable power source from the rechargeable battery pack through the charge control interface.

In another embodiment, a wearable apparatus is disclosed including a rechargeable power source housed within the wearable apparatus and a powered circuit configured to utilize power from the rechargeable power source also housed within the wearable apparatus and a physical and electrical connection between an external power pack and the wearable apparatus. Also within the wearable apparatus is a charge control circuit that accepts power from the external power pack through the electrical connection and recharges the rechargeable power source.

In another embodiment, a locator device is disclosed including a rechargeable power source housed within the locator device and a charging interface on an outside surface of the locator device adapted to accept and hold a rechargeable battery pack and adapted to conduct electricity from the rechargeable battery pack into the locator device. Also included is a charge control circuit for accepting the electricity from the charging interface and charging the rechargeable power source also housed within the locator device and a locator circuit housed within the locator device, the locator circuit powered by the rechargeable power source.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
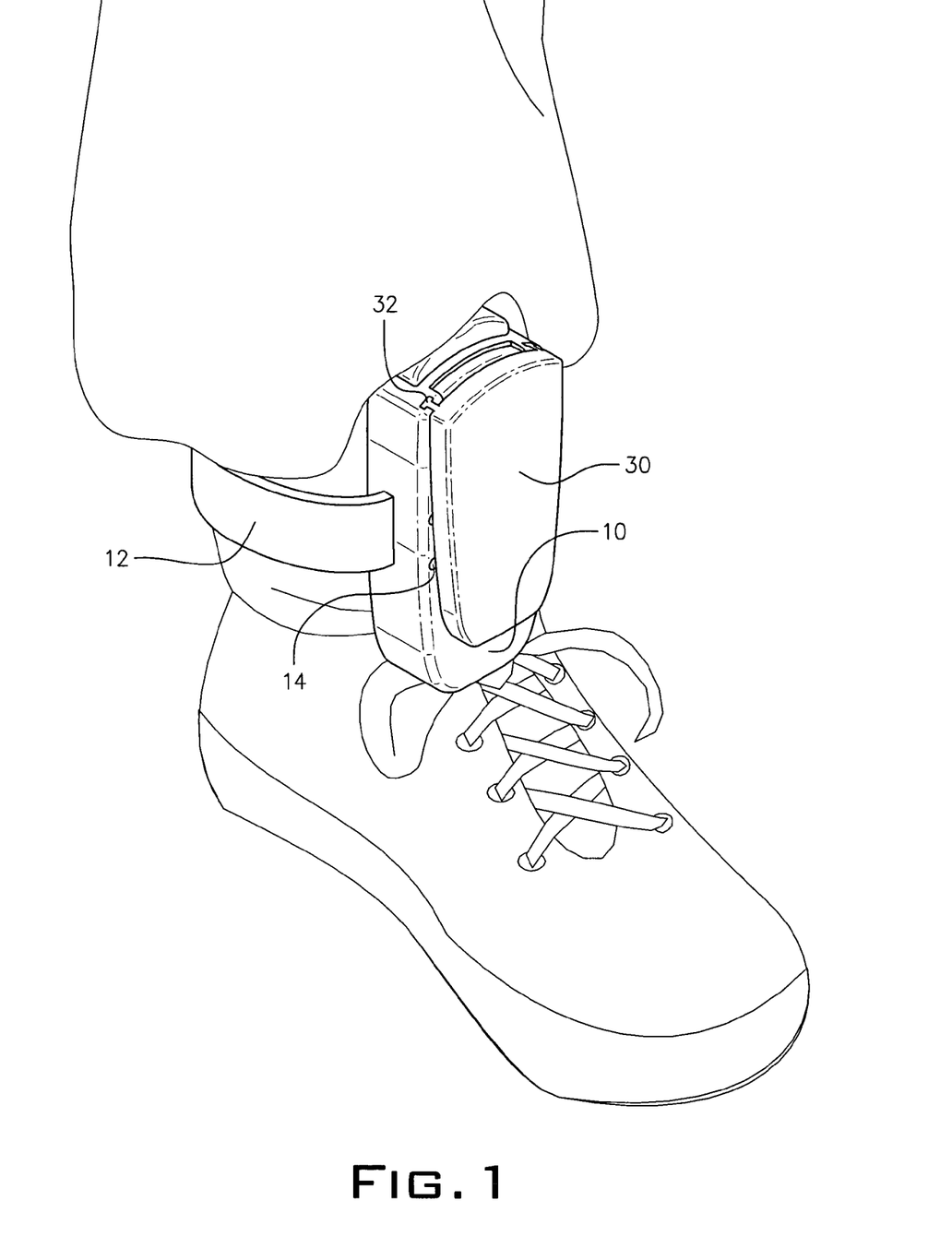
FIG. 1 is a perspective view of a worn device of the present invention with the battery pack attached.

Referring to FIG. 1, a perspective view of a worn device of the present invention with the battery pack attached will be described. The worn device 10 is affixed to a person, animal or inanimate device by a strap 12. In some embodiments, the strap 12 has a buckle or other method of removing. In the present embodiment, the strap 12 is locked in place by a plurality of pins 14 (in some embodiments, latches) that pass through the worn device 10 and the strap 12, securing the strap 12 to the worn device 10 and making it difficult to remove the worn device 10 from whatever it is attached. A rechargeable battery pack 30 is installed on the worn device 10 through rails 32 which are further described in FIG. 2. In another embodiment, the rechargeable battery pack 30 slides into a compartment, clip, holster or opening on a surface of the worn device 10. There are many ways known in the art to mount a battery pack to a device and this application is not limited to any particular mounting or attaching mechanism. Furthermore, in some embodiments, the battery pack is strapped to the person wearing the worn device and attached to the worn device by wires or cables. The rechargeable battery pack 30 consists of one or more high capacity capacitors or battery cells such as: lithium ion battery cells, nickel-metal hydride battery cells, lead acid battery cells, nickel-cadmium battery cells or lithium polymer battery cells.

In some embodiments, the worn device 10 is a personal locator or location transmitter, often used by law enforcement or corrections agency to monitor an individual who is under house arrest or the like. The locator 10 is locked onto the person's leg by a strap 12 that has pins 14 passing through it to lock it in place or by other means of locking. Since the locator 10 is worn for extended periods of time, perhaps years, there must be a way to recharge its internal power source. Prior to the present invention, the wearer was required to connect a power source cable or wire to the locator for enough time each day as to charge the internal power source. Unfortunately, the connection required the wearer to stay in one spot for a long period of time and the cable is very difficult to manage, presenting a tripping hazard as well. The present invention overcomes this problem by providing a rechargeable battery pack 30 that is charged, then clipped onto the locator 10 and the internal power source is charged from the rechargeable battery pack 30 without tethering the wearer to a charging station.

Figure 2:
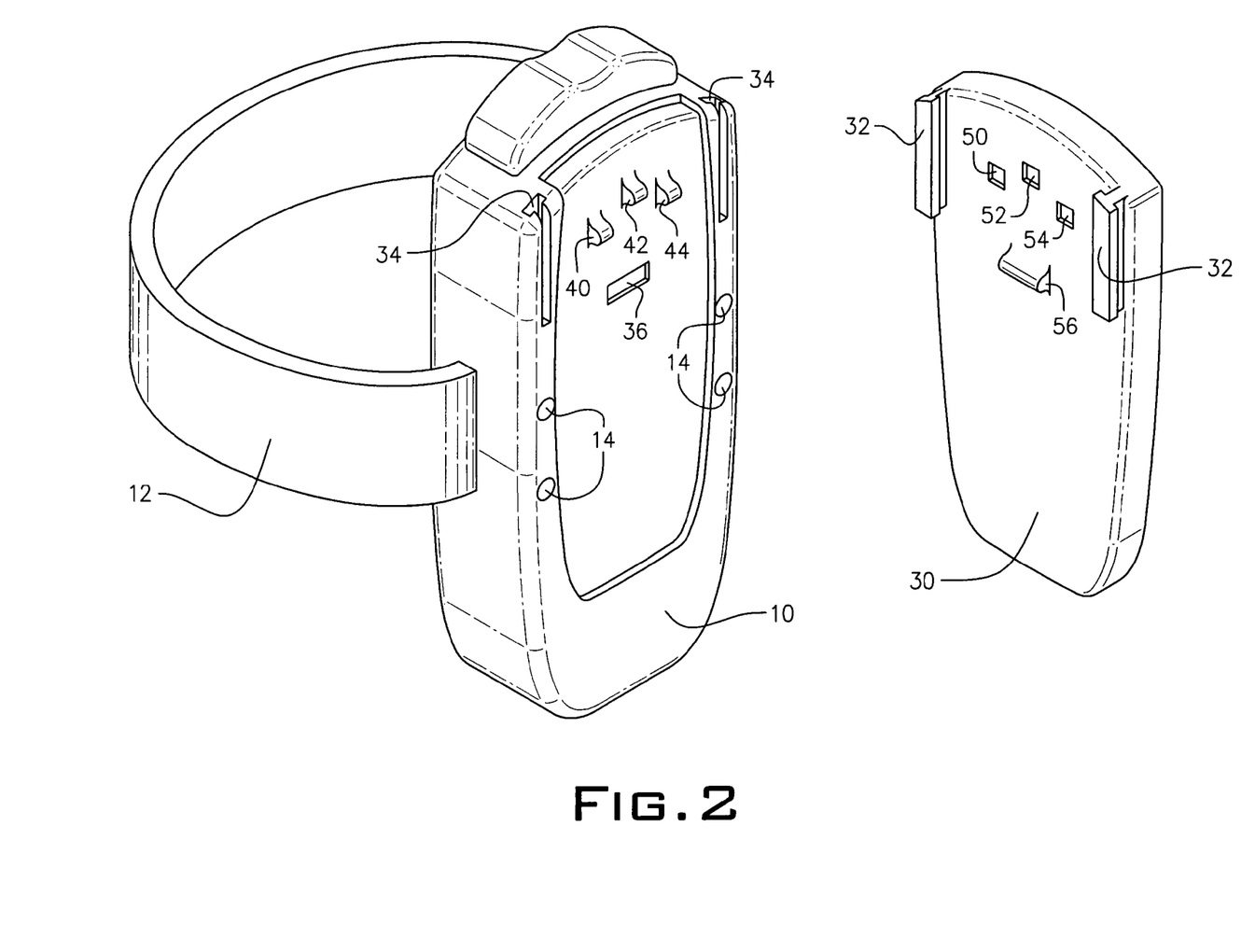
FIG. 2 is a perspective view of the worn device of the present invention with the battery pack separated.

Referring to FIG. 2, a perspective view of the worn device of the present invention with the rechargeable battery pack separated will be described. The worn device 10 has a strap 12 for affixing it to a person, animal or inanimate object. Pins 14 lock the strap to the worn device 10. A charging interface consists of a mechanical interface and an electrical interface. The mechanical interface includes slots 34 in the worn device 10 that accept rails 32 in the rechargeable battery pack 30, holding the rechargeable battery pack 30 against the worn device 10. In some embodiments, the rechargeable battery pack 30 stays in place by the force of gravity. In this embodiment, a detent 56 in the rechargeable battery pack 30 engages with a detent hole 36 in the worn device 10, holding the rechargeable battery pack 30 in place. The electrical interface includes battery contacts 50/52/54 that mate with contacts 40/42/44 on the worn device, passing electric current and, in some embodiments, battery status between the worn device 10 and the rechargeable battery pack 30. Although three contacts are shown, at least two are required to form a closed circuit passing electric current. In some embodiments, the number of contacts on the rechargeable battery pack 30 is different from the number of contacts on the worn device 10, as long as there are at least two that match.

Figure 3:
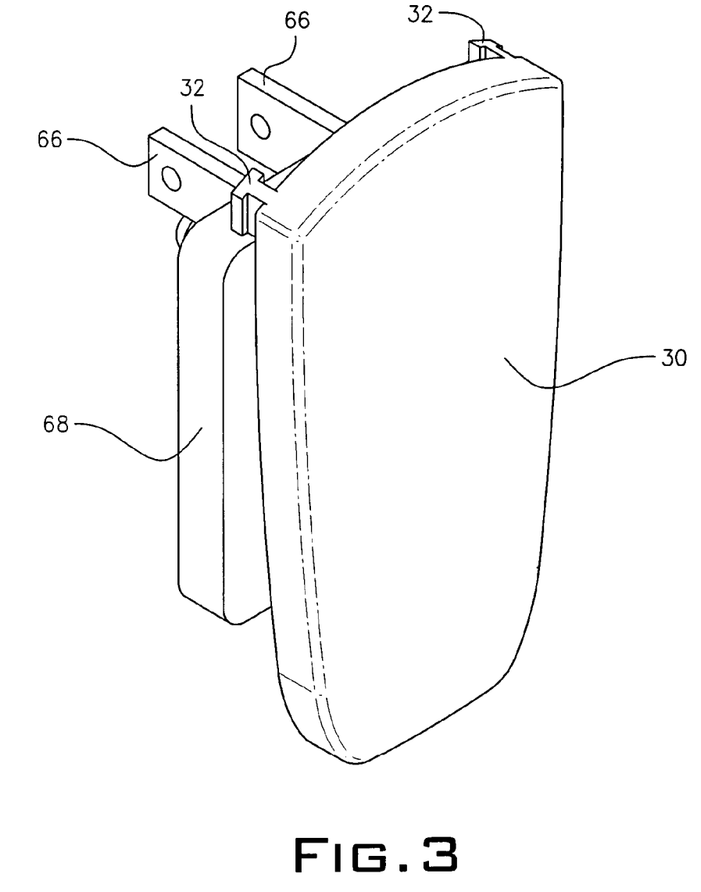
FIG. 3 is a perspective view of a charging device of the present invention with the battery pack inserted.

Referring to FIG. 3, a perspective view of a charging station of the present invention with the rechargeable battery pack 30 inserted will be described. The rechargeable battery pack 30 is shown with its rails 32 inserted into a charging station 68. The charging station 68 has electrical connections 66 for accepting electric current from a source of electricity such as a standard household circuit. In this embodiment, the charging device plugs directly into a common household electric outlet. In other embodiments, the charging device may be a station with a power cord that plugs into an electrical outlet or it may have a power supply or "brick" that plugs into an electrical outlet and provides low voltage to the charging device. In other embodiments, the charging station is a power brick or wall-wart that plugs directly into the rechargeable battery pack 30 and the battery pack and/or wall wart has circuitry to control the charging of the battery pack 30.

Figure 4:
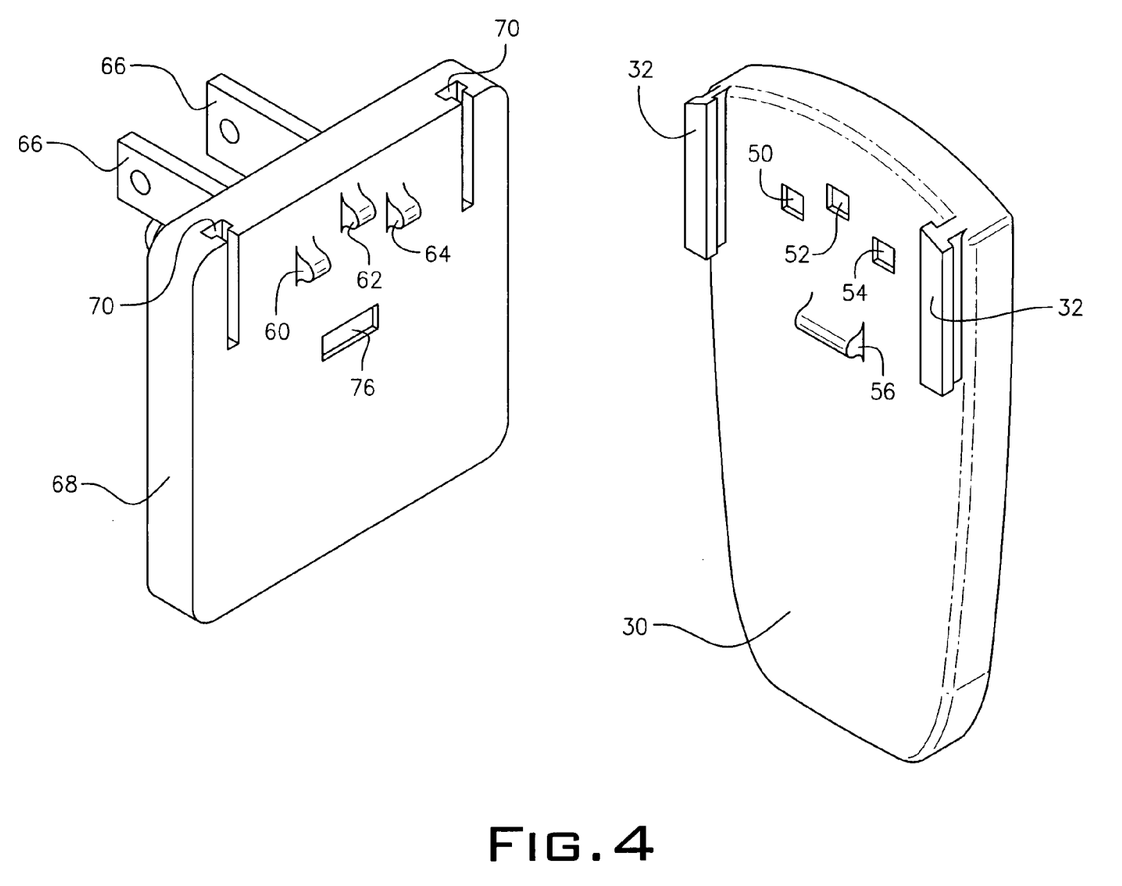
FIG. 4 is a perspective view of a charging device of the present invention with the battery pack separated.

Referring to FIG. 4, a perspective view of a charging station of the present invention with the battery pack separated. The rechargeable battery pack 30 is shown with its rails 32 for insertion into charging station slots 70. The charging station 68 has electrical connections 66 for accepting electric current from a source of electricity such as a standard household circuit. In this embodiment, the charging station 68 plugs directly into a common household electric outlet. Although the rechargeable battery pack 30 is shown with a bump 56 that holds it in place when the bump 56 mates with detent 76, the charging system works equally as well when the rechargeable battery pack 30 is held in place by gravity. Contacts 50/52/54 on the battery mate with contacts 60/62/64 on the charging device and provide charging current and in some embodiments, battery status between the charging station 68 and the rechargeable battery pack 30.

Figure 5:
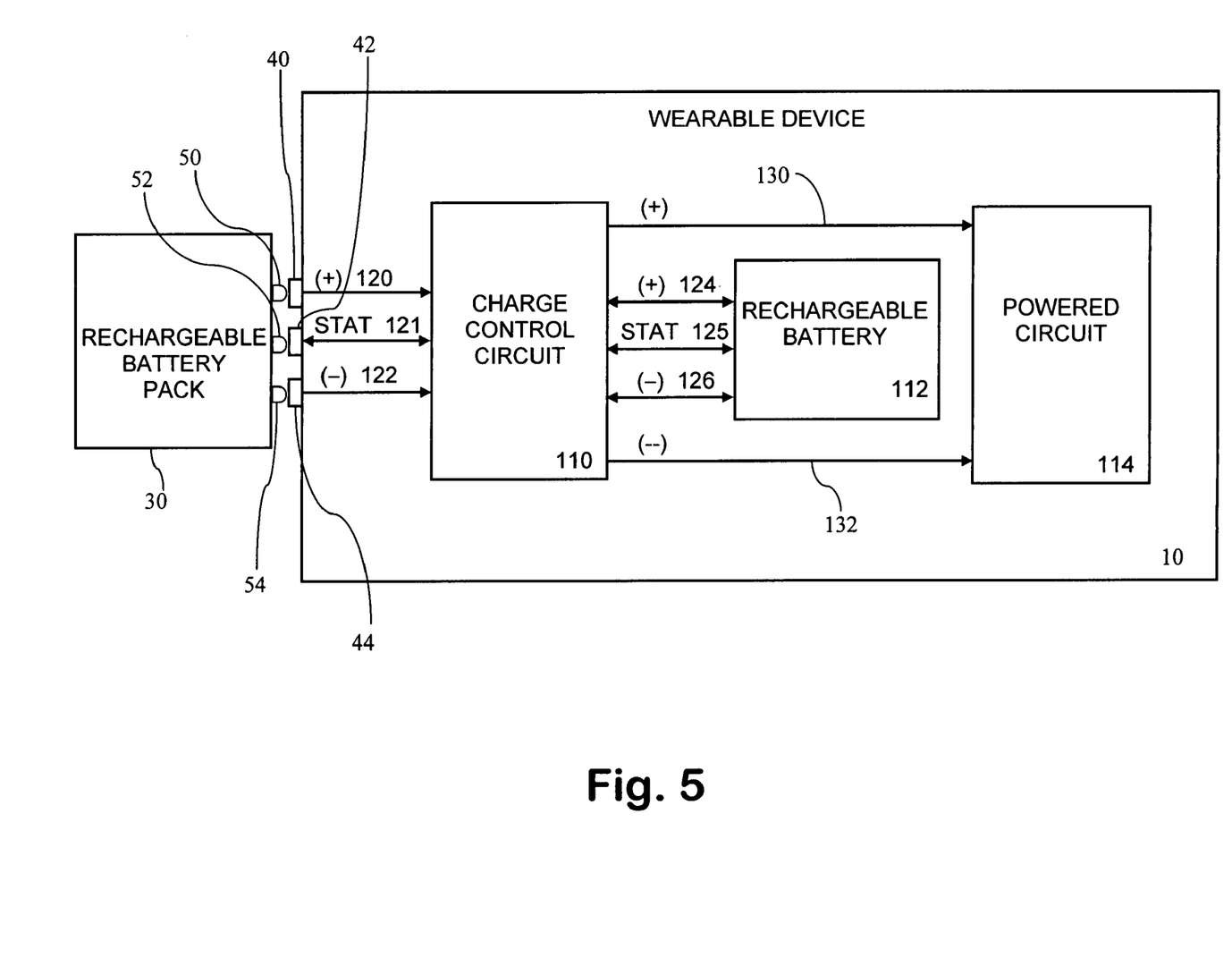
FIG. 5 is a block diagram of the worn device of the present invention.

Referring now to FIG. 5, the electrical operation of the system will be described. The wearable device 10 has a plurality of contacts 40/42/44 for mating with a plurality of contacts 50/52/54 on the rechargeable battery pack 30, making electrical contact when the rechargeable battery pack is attached to the wearable device 10. The plurality of contacts 40/42/44 on the wearable device passes electrical signals through the housing of the wearable device 10 and into a charge control circuit 110 within the wearable device 10. In this embodiment, there are three contacts 40/42/44 carrying three electrical signals 120/121/122 consisting of a positive voltage signal 120, a status signal 121 and a negative voltage signal 122. The positive 120 and negative 122 voltage signals provide electrical current to the charge control circuit 110 while the status signal 121 provides information regarding the current charge level of the rechargeable battery pack 30. In some embodiments two contacts are provided for a positive voltage signal 120 and a negative voltage signal 122. Any number of contacts may be used, as needed, as long as there are at least two contacts to provide a closed circuit, enabling current flow.

The charge control circuit 110 uses the electric current from the rechargeable battery pack 30 to recharge an internal rechargeable power source 112, in this example, a rechargeable battery 112. The rechargeable battery 112 consists of one or more battery cells, for example, lithium ion battery cells, nickel-metal hydride battery cells, lead acid battery cells, nickel-cadmium battery cells or lithium polymer battery cells. In some embodiments, the internal rechargeable power source 112 is a capacitor such as a super capacitor. In some embodiments, the internal power source 112 is designed to power the worn device for a short period of time, long enough to remove the rechargeable battery pack 30 and replace it with a second rechargeable battery pack 30 that has been recharged.

The internal rechargeable battery 112 has three connections 124/125/126 to the charge control circuit 110, positive 124, negative 126 and status 125. The charge control circuit 110 provides charging control to the internal rechargeable battery 112 while providing power to the internal powered circuit or active circuit 114 through a positive conductor 130 and a negative conductor 132, although in some embodiments multiple voltage levels are provided to the powered circuit 114. The charge control circuit 110 has voltage and current conditioning circuitry to provide the correct voltages and currents to the powered circuit 114 both when the rechargeable battery pack 30 is connected and when the rechargeable battery pack 30 is absent. In some embodiments, the worn device is a location transmitter and the powered circuit 114 is a locator device circuit as shown in FIG. 1. In some embodiments, the powered circuit 114 includes a processor and memory.

Figure 6:
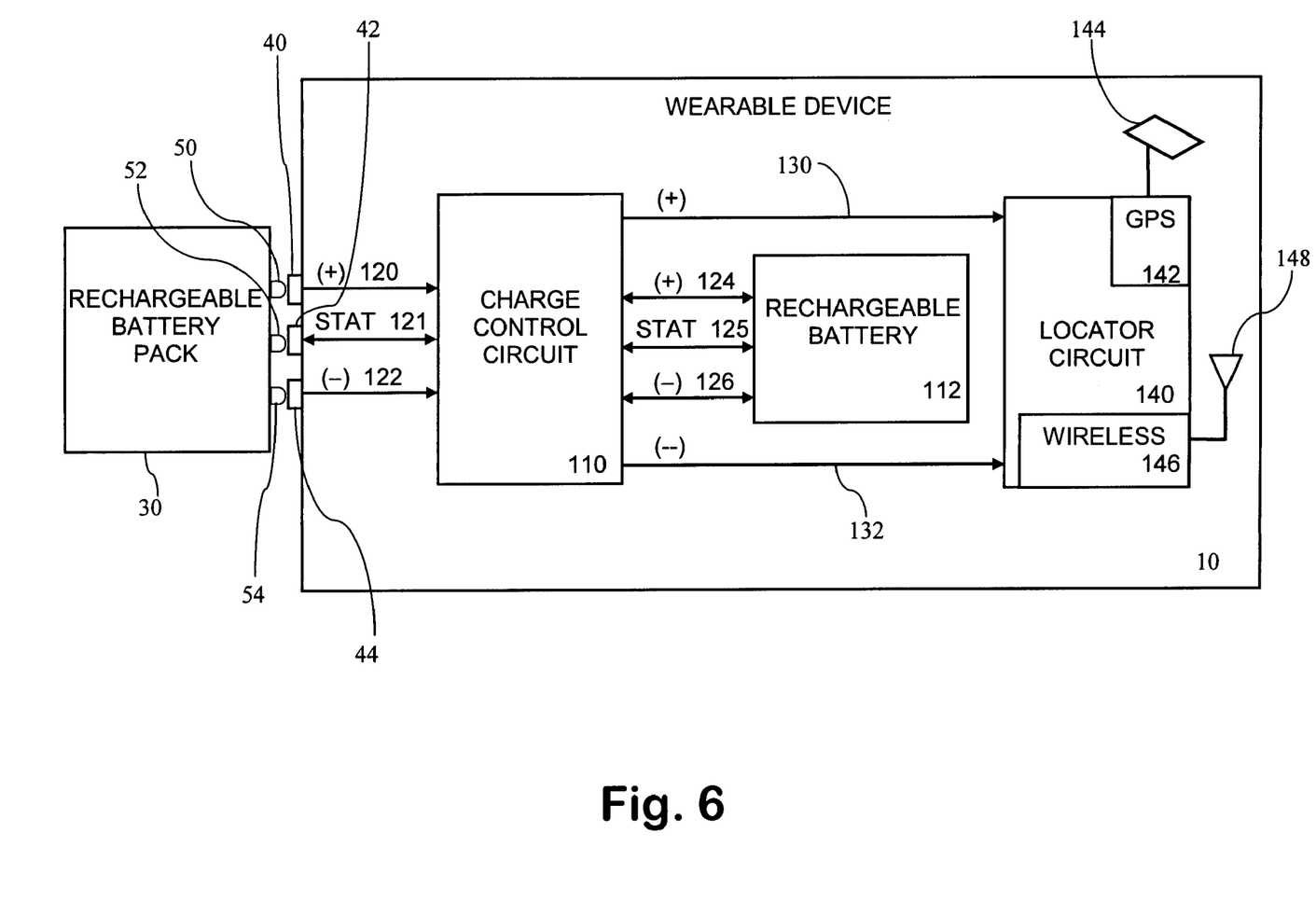
FIG. 6 is a block diagram of the locator device of the present invention.

Referring now to FIG. 6, the electrical operation of the locator device will be described. The wearable device 10 has a plurality of contacts 40/42/44 for mating with a plurality of contacts 50/52/54 on the rechargeable battery pack 30, making electrical contact when the rechargeable battery pack 30 is installed on the wearable device 10. The plurality of contacts 40/42/44 on the wearable device, pass electrical signals through the housing of the wearable device 10 and into a charge control circuit 110 within the wearable device 10. In this embodiment, there are three contacts 40/42/44 carrying three electrical signals consisting of a positive voltage signal 120, a status signal 121 and a negative voltage signal 122. The positive 120 and negative 122 voltage signals provide electrical current to the charge control circuit and the status signal provides information regarding the current charge level of the rechargeable battery pack 30. In some embodiments two contacts are provided for a positive voltage signal 40 and a negative voltage signal 44. Any number of contacts may be used, as needed, as long as there are at least two contacts to provide a closed circuit, enabling current flow.

The charge control circuit 110 uses the electric current from the rechargeable battery pack 30 to recharge an internal rechargeable power source 112, in this example, a rechargeable battery 112. In this example, the internal rechargeable battery 112 has three connections 124/125/126 to the charge control circuit 110, positive 124, negative 126 and status 125. The charge control circuit 110 provides charging control to the rechargeable battery 112 while providing power to the locator circuit 140 through a positive conductor 130 and a negative conductor 132. The charge control circuit 110 has voltage and current conditioning circuitry to provide the correct voltages and currents to the locator circuit 140 both when the rechargeable battery pack 30 is connected and when the rechargeable battery pack 30 is absent, at which time power is provided from the rechargeable battery 112. The locator circuit 140 has a location receiver, in this example a GPS receiver 142 with a GPS antenna 144. In addition, the locator circuit 140 has a wireless transmitter (or transceiver) 146 with an antenna 148 for sending location information. In some embodiments, the wireless transmitter (or transceiver) uses radio frequency waves while in other embodiments, it uses light waves such as infra-red.

Figure 7:
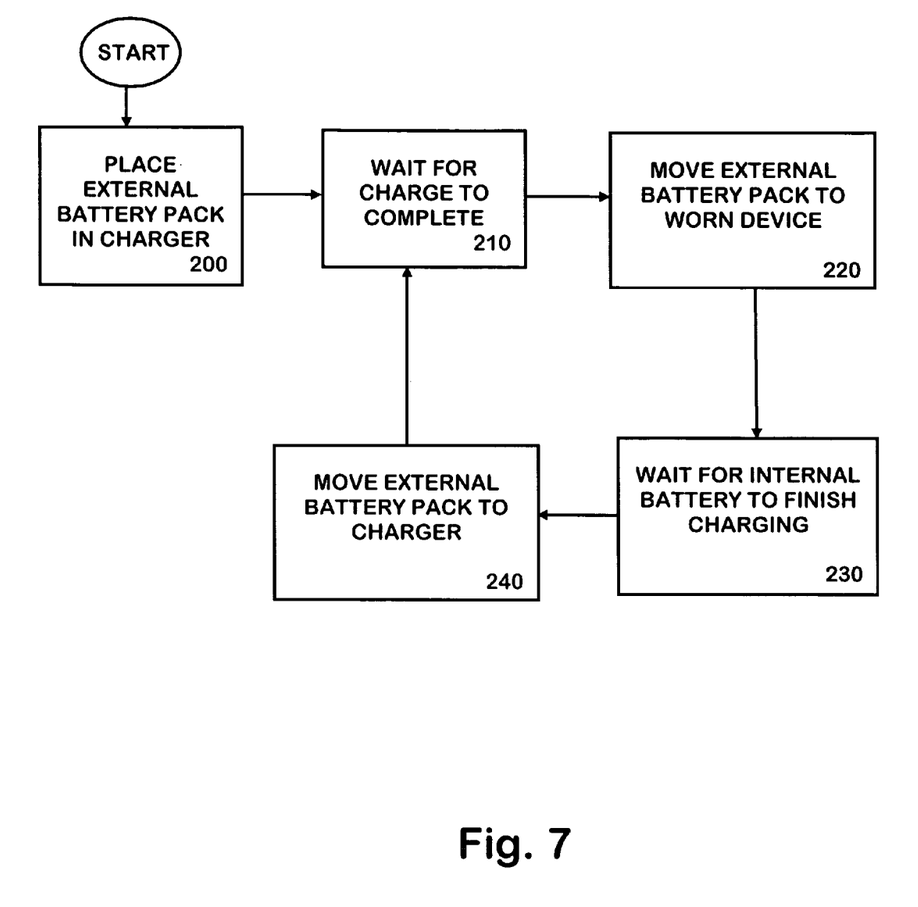
FIG. 7 is a flow chart describing the use of the present invention.

Referring now to FIG. 7, the operation of the locator device will be described. To start, the rechargeable battery pack 30 is placed in the charger 68 (step 200). Next, wait for the rechargeable battery pack 30 to charge 210. Next, the rechargeable battery pack 30 is moved and inserted into the worn device 10 (step 220). The rechargeable battery pack 30 is left attached to the worn device 10 long enough to charge the internal power source 112 in step 230. Once the internal power source 112 is sufficiently charged, the rechargeable battery pack 30 is moved back and attached to the charger 68 (step 240) then the process is repeated with step 210.

There are many ways to determine if the rechargeable battery pack 30 and internal power source 112 are charged, including charging light emitting diodes (LEDs) or lamps, charge complete LEDs or lamps or audible signals.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for charging a personal locator, the system comprising:
    a rechargeable power source housed within a personal locator;
    a charging interface on an outside surface of the personal locator, the charging interface accepts and secures a rechargeable battery pack to the personal locator until force is applied to the rechargeable battery pack to remove the rechargeable battery pack from the charging interface, the charging interface has conductors that conduct electricity from the rechargeable battery pack into the personal locator;
    a charge control circuit accepting the electricity from the charging interface and charging the rechargeable power source, the charge control circuit housed within the personal locator; and
    a powered circuit housed within the personal locator, the powered circuit powered by the rechargeable power source, the powered circuit having a means for determining a location of the personal locator and the powered circuit having a means for transmitting the location of the personal locator, whereas the personal locator is worn on an animate being.

2. The system for charging the personal locator of claim 1, wherein the rechargeable power source is at least one rechargeable battery cell.

3. The system for charging the personal locator of claim 2, wherein the at least one rechargeable battery cell is selected from the group consisting of a lithium ion battery cell, a nickel-metal hydride battery cell, a lead acid battery cell, a nickel—cadmium battery cell and a lithium polymer battery cell.

4. The system for charging the personal locator of claim 1, wherein the rechargeable power source is at least one capacitor.

5. The system for charging the personal locator of claim 1, wherein the rechargeable battery pack has one or more battery cells and the one or more battery cells are selected from the group consisting of a lithium ion battery cell, a nickel-metal hydride battery cell, a lead acid battery cell, a nickel—cadmium battery cell and a lithium polymer battery cell.

6. The system for charging the personal locator of claim 1, wherein the charging interface has at least two electrical contacts for mating with contacts on the rechargeable battery pack and one of the at least two electrical contacts is a positive voltage contact and another one of the at least two electrical contacts is a negative voltage contact.

7. The system for charging the personal locator of claim 1, wherein the charging interface secures the rechargeable battery pack to the outside surface of the worn device with at least one detent mechanism.

8. The system for charging the personal locator of claim 1, further comprising a charging station connected to a source of electricity, the charging station configured to interface with the rechargeable battery pack and the charging station configured to charge the rechargeable battery pack.

9. The system for charging the personal locator of claim 1, wherein the means for transmitting the location of the personal locator is a radio frequency transmitter.

10. The system for charging the personal locator of claim 9, further comprising a locking means configured to secure the personal locator in place on an animate being.

11. The system for charging the personal locator of claim 9, wherein the means for determining the location of the personal locator is a global positioning satellite receiver.

12. The system for charging the personal locator of claim 11, wherein the locator device circuit includes a global positioning satellite receiver and a wireless transceiver.

13. The system for charging the personal locator of claim 5, wherein the charging interface further comprises a clip and the clip accepts and secures the rechargeable battery pack to the personal locator.

14. The system for charging the personal locator of claim 6, wherein the charging interface further comprises a holster and the holster accepts and secures the rechargeable battery pack to the personal locator.

15. A method of charging a worn device comprising:
providing a personal locator, the personal locator having:
a rechargeable power source housed within the personal locator;
a charging interface on an outside surface of the personal locator, the charging interface accepts and retains a rechargeable battery pack until the rechargeable battery pack is removed by an external force applied to the rechargeable battery pack and the charging interface having contacts to conduct electricity from the rechargeable battery pack into the personal locator;
a charge control circuit accepting the electricity from the contacts and charging the rechargeable power source, the charge control circuit housed within the personal locator; and
an active circuit housed within the personal locator, the active circuit powered by the rechargeable power source, the active circuit having a means for determining a location of the personal locator and the active circuit having a means for transmitting the location of the personal locator to a remote location;
providing the rechargeable battery pack;
providing a charging station, the charging station connected to a source of electricity and the charging station charges the rechargeable battery pack when the rechargeable battery pack is interfaced to the charging station;
charging the rechargeable battery pack in the charging station;
transferring the rechargeable battery pack from the charging station to the charging interface; and
charging the rechargeable power source from the rechargeable battery pack through the contacts.

16. The method of charging a worn device of claim 15, wherein the rechargeable power source is at least one rechargeable battery cell.

17. The method of charging a worn device of claim 16, wherein the rechargeable battery is selected from the group consisting of a lithium ion battery, a nickel-metal hydride battery, a lead acid battery, a nickel—cadmium battery and a lithium polymer battery.

18. The method of charging a worn device of claim 15, wherein the rechargeable power source is a capacitor.

19. The method of charging a worn device of claim 15, wherein the portable battery is a rechargeable battery pack.

20. The method of charging a worn device of claim 19, wherein the rechargeable battery pack has one or more battery cells and the one or more battery cells are selected from the group consisting of a lithium ion battery, a nickel-metal hydride battery, a lead acid battery, a nickel—cadmium battery and a lithium polymer battery.

21. The method of charging a worn device of claim 15, wherein the personal locator includes a transmitter, the transmitter configured to periodically transmit a location of the worn device.

22. The method of charging a worn device of claim 21, further comprising a locking means configured to secure the personal locator in place.

23. The method of charging a worn device of claim 21, wherein the means for determining the location of the personal locator and the means for transmitting the location of the personal locator to the remote location comprises at least a global positioning satellite circuit and a wireless transmitter.

24. The method of charging a worn device of claim 20, wherein the charging interface further comprises a clip, the clip accepts and retains the rechargeable battery pack until the rechargeable battery pack is removed by an external force applied to the rechargeable battery pack.

25. The method of charging a worn device of claim 20, wherein the charging interface includes a plurality of slots and the rechargeable battery pack includes an equal number or rails, the rails interfacing with the slots, thereby holding the rechargeable battery pack engaged with the charging interface by a force of gravity.

26. A personal locator, the personal locator comprising:
a rechargeable power source housed within the personal locator;
a powered circuit configured to utilize power from the rechargeable power source, the powered circuit housed within the personal locator, the powered circuit comprising a means for determining a location of the personal locator and the powered circuit having a means for transmitting the location of the personal locator to a remote location;
a means for removably securing an external battery pack to the personal locator, the battery pack removably affixed to the means for removably securing until an external force is applied to the external battery pack, thereby initiating removal of the external battery pack from the personal locator; and
a charge control circuit housed within the personal locator, the charge control circuit accepting electricity from the external battery pack through the means for removably securing, the charge control circuit adapted to recharge the chargeable power source.

27. The wearable apparatus of claim 26, wherein the rechargeable power source is at least one rechargeable battery cell.

28. The personal locator of claim 27, wherein the rechargeable battery is selected from the group consisting of a lithium ion battery, a nickel-metal hydride battery, a lead acid battery, a nickel—cadmium battery and a lithium polymer battery.

29. The personal locator of claim 26, wherein the rechargeable power source is at least one capacitor.

30. The personal locator of claim 26, wherein the external battery pack is a rechargeable battery pack.

31. The personal locator of claim 30, wherein the rechargeable battery pack has one or more battery cells and the one or more battery cells are selected from the group consisting of a lithium ion battery, a nickel-metal hydride battery, a lead acid battery, a nickel—cadmium battery and a lithium polymer battery.

32. The personal locator of claim 31, further comprising a charging station configured to interface with the rechargeable battery pack, the charging station configured to hold and charge the external battery pack, the charging station connected to a source of electricity.

33. The personal locator of claim 26, further comprising a locking means configured to secure the personal locator in place on a leg of an animate being.

34. personal locator of claim 31, wherein the means for removably securing the external battery pack further comprises a clip, the clip securing the external battery pack to the personal locator until an external force is applied to the external battery power pack to remove the external battery pack from the personal locator, the clip includes at least one detent mechanism.

35. The personal locator of claim 31, wherein the means for removably securing include at least one slot on the personal locator, the at least one slot accepting a rail, the rail affixed to the external battery pack, the external battery pack remaining attached to the personal locator by the means for removably securing until an external force is applied to the external battery pack.

36. A locator device worn by a person, the locator device comprising:
   a rechargeable power source housed within a locator device;
   a charging interface on an outside surface of the locator device, the charging interface removably holds a rechargeable battery pack, the rechargeable battery pack retained by the charging interface until an external force is applied to the rechargeable battery pack to remove the rechargeable battery pack from the charging interface and the charging interface adapted to conduct electricity from the rechargeable battery pack into the locator device;
   a charge control circuit accepting the electricity from the charging interface and charging the rechargeable power source, the charge control circuit housed within the locator device; and
   a locator circuit housed within the locator device, the locator circuit powered by the rechargeable power source, the locator circuit comprising a means for determining a location of the locator device and the locator circuit also comprising a means for transmitting the location of the locator device to a remote location.

37. The locator device of claim 36, wherein the rechargeable power source is at least one rechargeable battery cell.

38. The locator device of claim 37, wherein the at least one rechargeable battery cell is selected from the group consisting of a lithium ion battery cell, a nickel-metal hydride battery cell, a lead acid battery cell, a nickel—cadmium battery cell and a lithium polymer battery cell.

39. The locator device of claim 36, wherein the rechargeable power source is at least one capacitor.

40. The locator device of claim 36, wherein the rechargeable battery pack has one or more battery cells and the one or more battery cells are selected from the group consisting of a lithium ion battery cell, a nickel-metal hydride battery cell, a lead acid battery cell, a nickel—cadmium battery cell and a lithium polymer battery cell.

41. The locator device of claim 36, wherein the charging interface has at least two electrical contacts for mating with contacts on the rechargeable battery pack and one of the at least two electrical contacts is a positive voltage contact and another one of the at least two electrical contacts is a negative voltage contact.

42. The locator device of claim 41, wherein the charging interface physically holds and retains the rechargeable battery pack to the outside surface of the worn device until an external force is applied to the rechargeable battery pack and the rechargeable battery pack is removed.

43. The locator device of claim 36, further comprising a charging station connected to a source of electricity, the charging station configured to interface with the rechargeable battery pack and the charging station configured to charge the rechargeable battery pack.

44. The locator device of claim 36, further comprising a locking means configured to secure the worn device in place.

45. The locator device of claim 41, wherein the charging interface further comprises a clip having at least one detent mechanism for securely holding the battery pack against the at least two electrical contacts until the external force is applied to the rechargeable battery pack.

46. The locator device of claim 41, wherein the charging interface further comprises a holster for holding the rechargeable battery pack against the at least two electrical contacts.

47. The locator device of claim 36, wherein the means for determining the location of the locator device is a global positioning satellite receiver and the means for transmitting the location of the locator device to the remote location is a wireless transmitter.

* * * * *